(12) United States Patent
Piatt et al.

(10) Patent No.: US 9,516,937 B2
(45) Date of Patent: Dec. 13, 2016

(54) FOLIO CASE FOR A PORTABLE ELECTRONIC DEVICE WITH INLAID FABRIC

(71) Applicant: Samsonite IP Holdings S.àr.I., Luxembourg (LU)

(72) Inventors: James Piatt, San Francisco, CA (US); Bryan Lee Hynecek, Redwood City, CA (US); Randy Chiang, San Jose, CA (US)

(73) Assignee: Samsonite IP Holdings S.àr.l., Luxembourg (LU)

( * ) Notice: Subject to any disclaimer, the term of this patent is extended or adjusted under 35 U.S.C. 154(b) by 0 days.

(21) Appl. No.: 14/083,951

(22) Filed: Nov. 19, 2013

(65) Prior Publication Data

US 2014/0202891 A1    Jul. 24, 2014

Related U.S. Application Data

(60) Provisional application No. 61/728,560, filed on Nov. 20, 2012.

(51) Int. Cl.
  *B65D 85/00*     (2006.01)
  *A45C 13/34*     (2006.01)
  (Continued)

(52) U.S. Cl.
  CPC ............... *A45C 13/34* (2013.01); *A45C 11/00* (2013.01); *G06F 1/1626* (2013.01);
  (Continued)

(58) Field of Classification Search
  CPC ..... A45C 13/34; A45C 11/00; A45C 2200/15; A45C 2011/003; G06F 1/1626; G06F 1/1628
  (Continued)

(56) References Cited

U.S. PATENT DOCUMENTS 6,697,045 B2 * 2/2004 Min ............................ 345/156
7,325,677 B2 * 2/2008 Gelardi et al. ............. 206/308.1
(Continued)

FOREIGN PATENT DOCUMENTS

CN    101842029    9/2010
CN    102370309    3/2012
(Continued)

OTHER PUBLICATIONS

Notification of Transmittal of the International Search Report and Written Opinion for PCT/US2013/070787 dated Feb. 27, 2014.
(Continued)

*Primary Examiner* — Luan K Bui
(74) *Attorney, Agent, or Firm* — Frommer Lawrence & Haug LLP

(57) ABSTRACT

A case for enclosing a personal electronic device with a front surface is described. The case comprises a front with an inside surface, an outside surface, and at least one raised front edge surface; a back with an inside surface to mount the personal electronic device, an outside surface, and at least one raised rear edge surface a surface cover; wherein the front inside surface. The front outside surface and the back outside surface are overlaid with the surface cover. The surface cover abuts the at least one raised front edge surface or the at least one raised rear edge surface.

19 Claims, 17 Drawing Sheets

(51) Int. Cl.
 *A45C 11/00* (2006.01)
 *G06F 1/16* (2006.01)
(52) U.S. Cl.
 CPC ...... *G06F 1/1628* (2013.01); *A45C 2011/003* (2013.01); *A45C 2200/15* (2013.01)
(58) Field of Classification Search
 USPC .................. 206/45.2, 45.23, 45.24, 320, 576
 See application file for complete search history.

(56) References Cited

U.S. PATENT DOCUMENTS

| | | | |
|---|---|---|---|
| 8,474,609 B1* | 7/2013 | Hong et al. | 206/45.2 |
| 8,672,126 B2* | 3/2014 | Rohrbach et al. | 206/320 |
| 8,708,140 B2* | 4/2014 | Liu | 206/45.23 |
| 8,724,300 B2* | 5/2014 | Smith | G06F 1/1628 206/320 |
| 8,763,795 B1* | 7/2014 | Oten et al. | 206/45.23 |
| 8,887,902 B1* | 11/2014 | Liu | 206/45.23 |
| 2003/0196916 A1* | 10/2003 | Jakobowicz | 206/308.1 |
| 2004/0114315 A1* | 6/2004 | Anlauff | G06F 1/162 361/679.28 |
| 2010/0089778 A1* | 4/2010 | Park | 206/320 |
| 2011/0290687 A1* | 12/2011 | Han | A45C 3/02 206/320 |
| 2012/0024560 A1 | 2/2012 | Mongan et al. | |
| 2012/0037523 A1* | 2/2012 | Diebel | A45C 11/00 206/320 |
| 2012/0043234 A1* | 2/2012 | Westrup | 206/320 |
| 2012/0043247 A1 | 2/2012 | Westrup | |
| 2013/0020215 A1* | 1/2013 | Hsu | F16M 11/041 206/320 |
| 2013/0313142 A1* | 11/2013 | Wen | A45C 11/00 206/320 |
| 2014/0021092 A1 | 1/2014 | Murphy et al. | |

FOREIGN PATENT DOCUMENTS

| | | |
|---|---|---|
| CN | 202233549 | 5/2012 |
| CN | 202331285 | 7/2012 |
| CN | 202502441 | 10/2012 |
| KR | 20-2009-0008589 | 8/2009 |
| KR | 20-2011-0011985 | 12/2011 |
| KR | 20-2012 0000423 | 1/2012 |
| KR | 10-2012-0115872 | 10/2012 |

OTHER PUBLICATIONS

Gadge Tell Review: Blurex Slim Folio Case for the Kindle fire HD 7-inch, Nov. 5, 2012 (http://www.technologytell.com/gadgets/I05462/gadgetell-review-blurex-slim-filio-case-for-the-kindle-fire-hd-7-inch/).
Smart Case for iPad review, Jun. 13, 2012 (http://www.imore.com/smart-case-ipad-review).
STM Grip for iPad (3rd-Gen), Mar. 21, 2012 (http://www.ilounge.com/index.php/reviews/entry/stm-grip-for-ipad-3rd-gen/).
Chinese First Office Action for application No. 201380066845.4 dated Jun. 24, 2016.

* cited by examiner

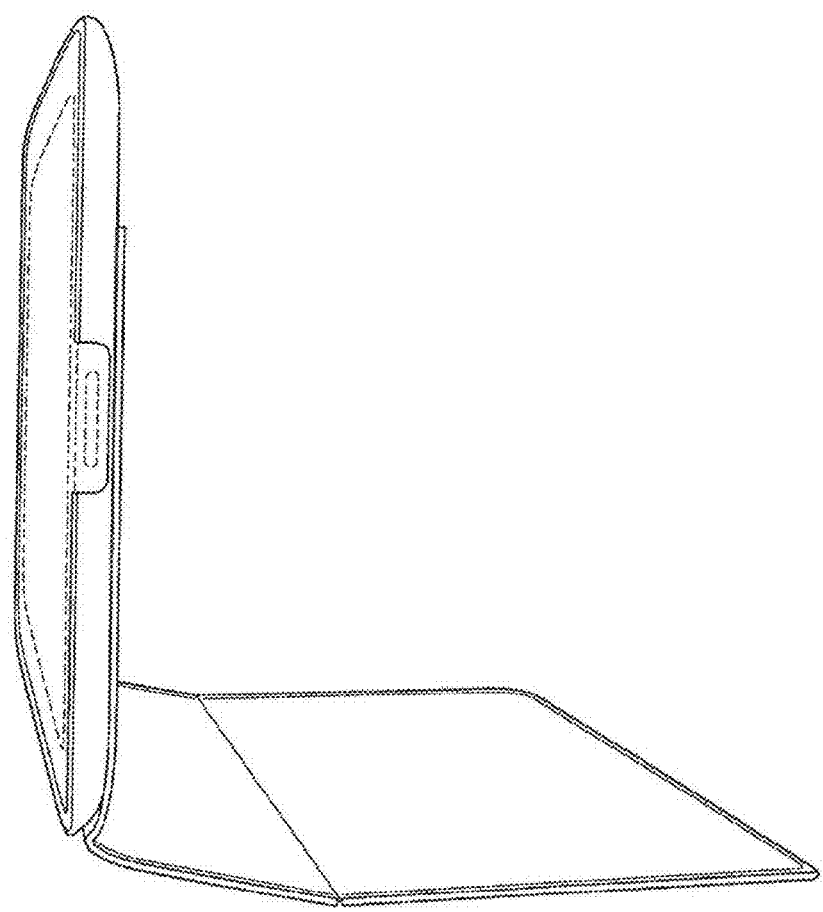

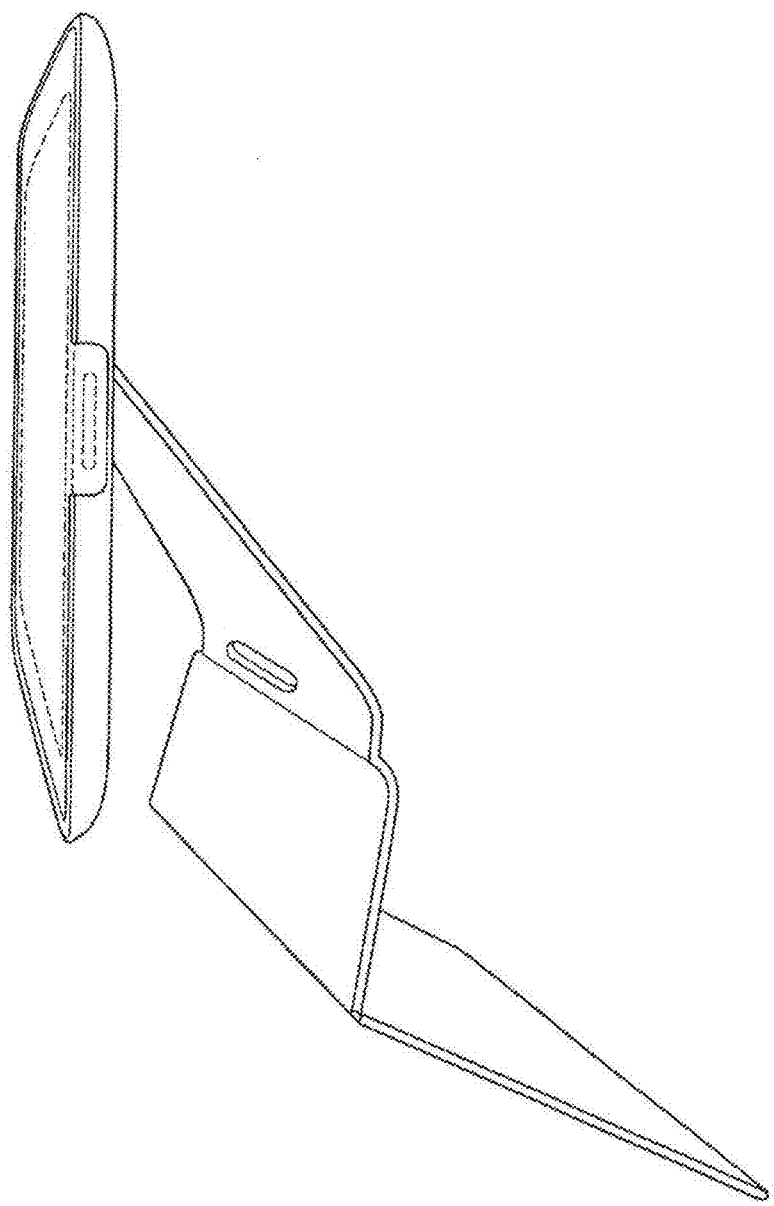

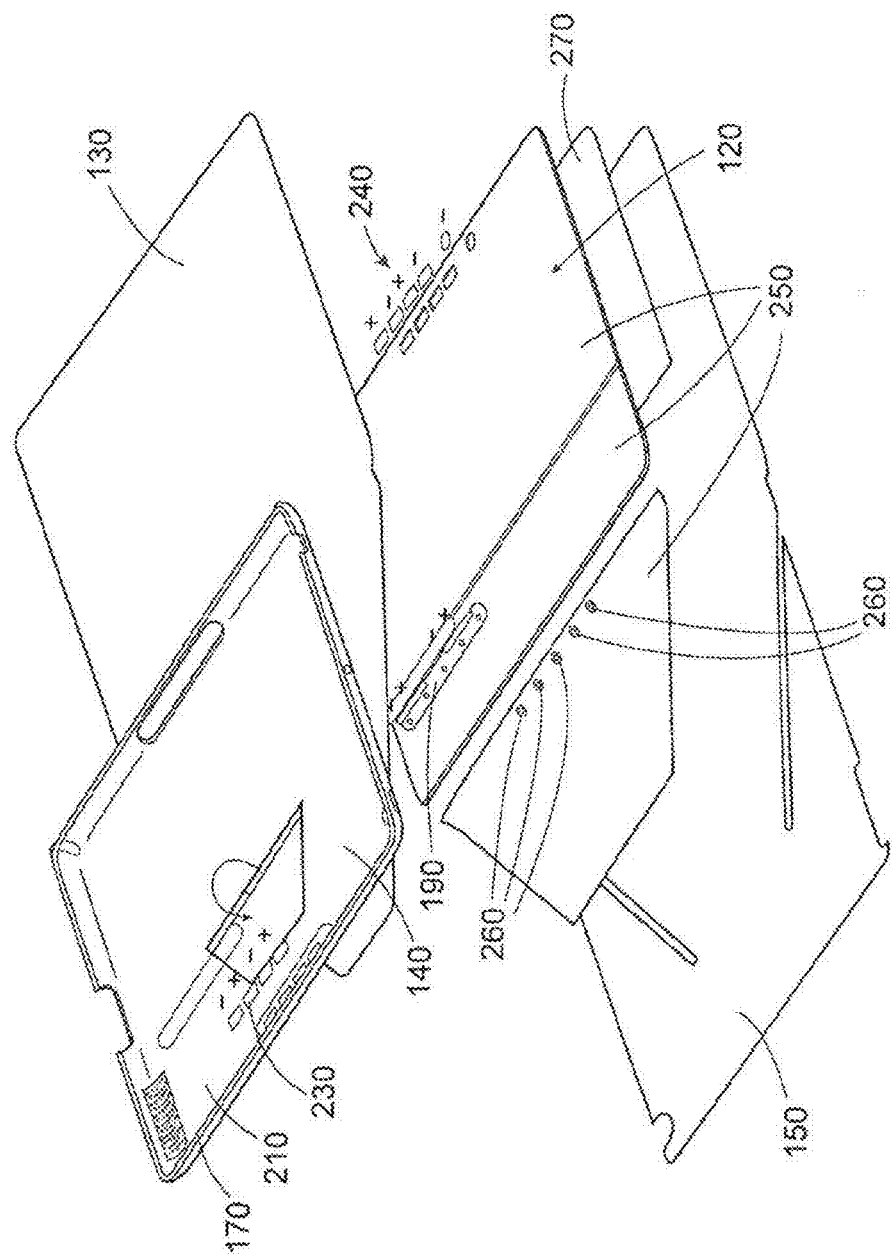

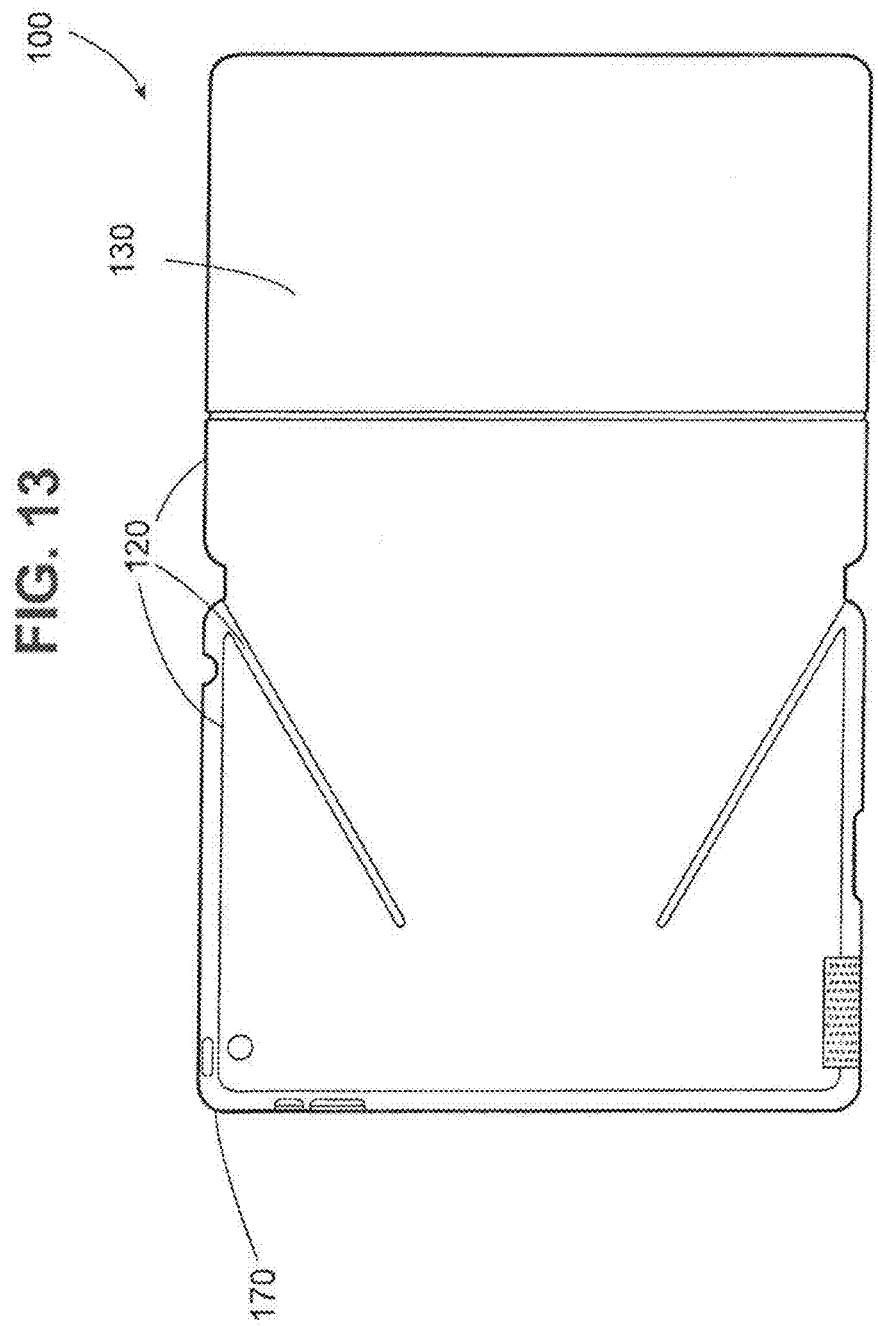

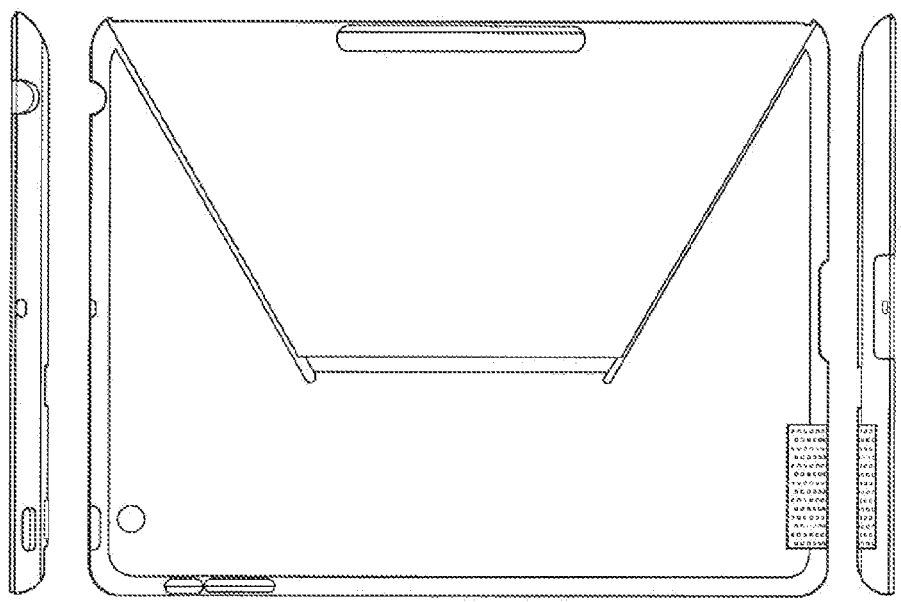

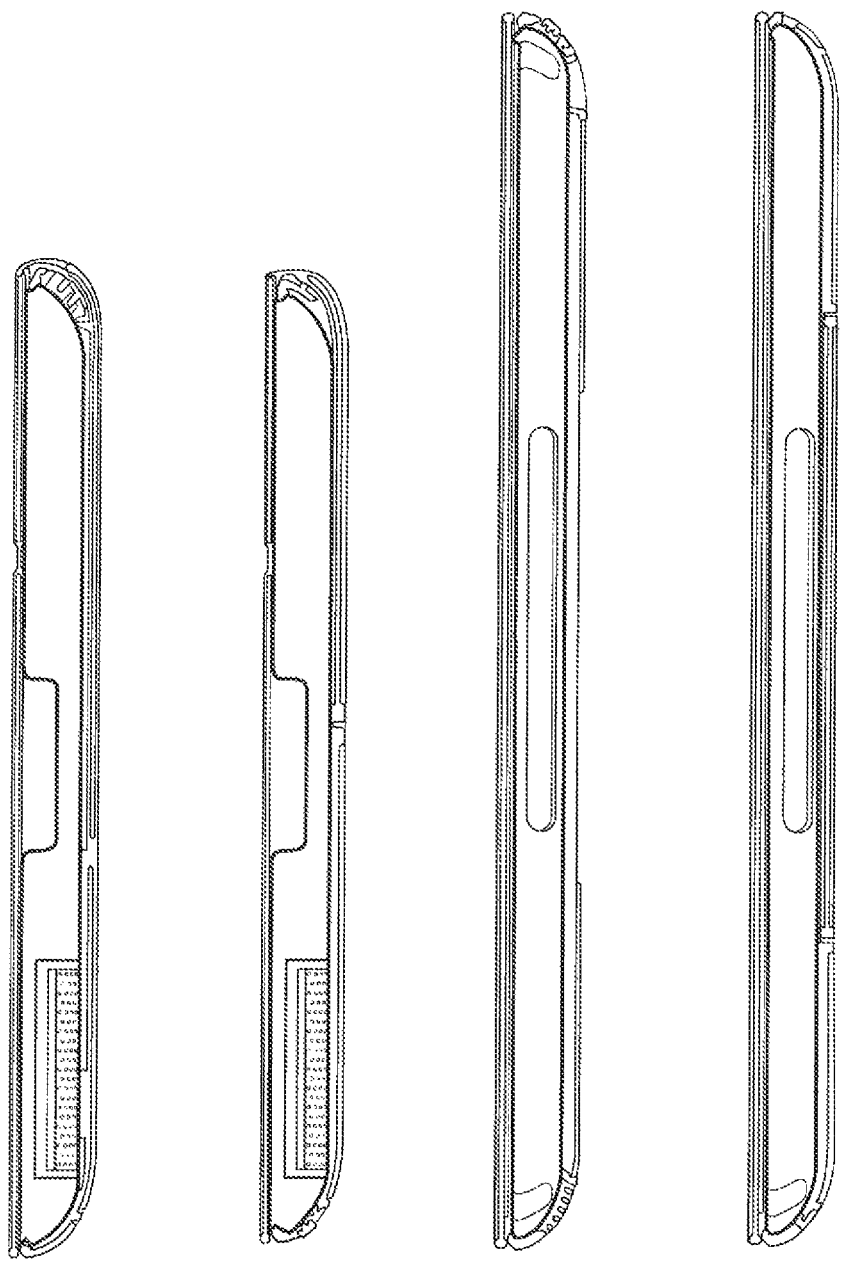

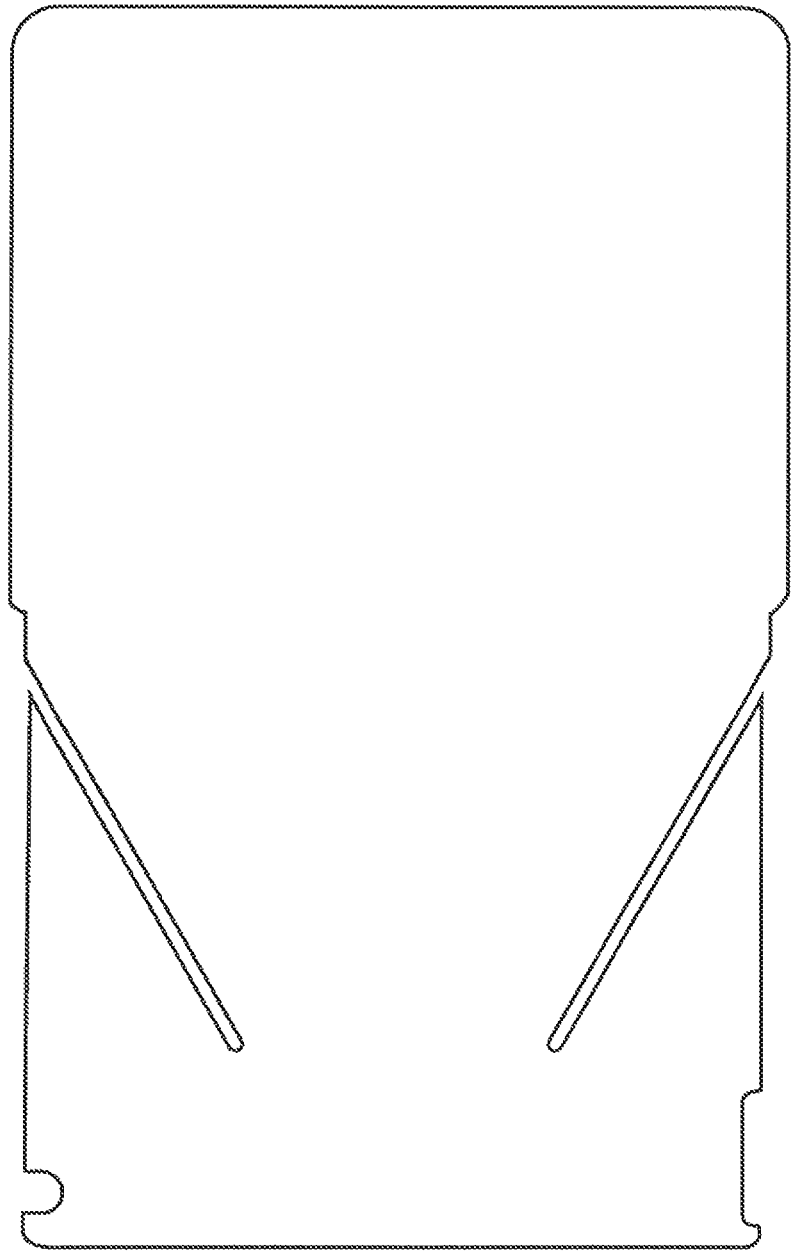

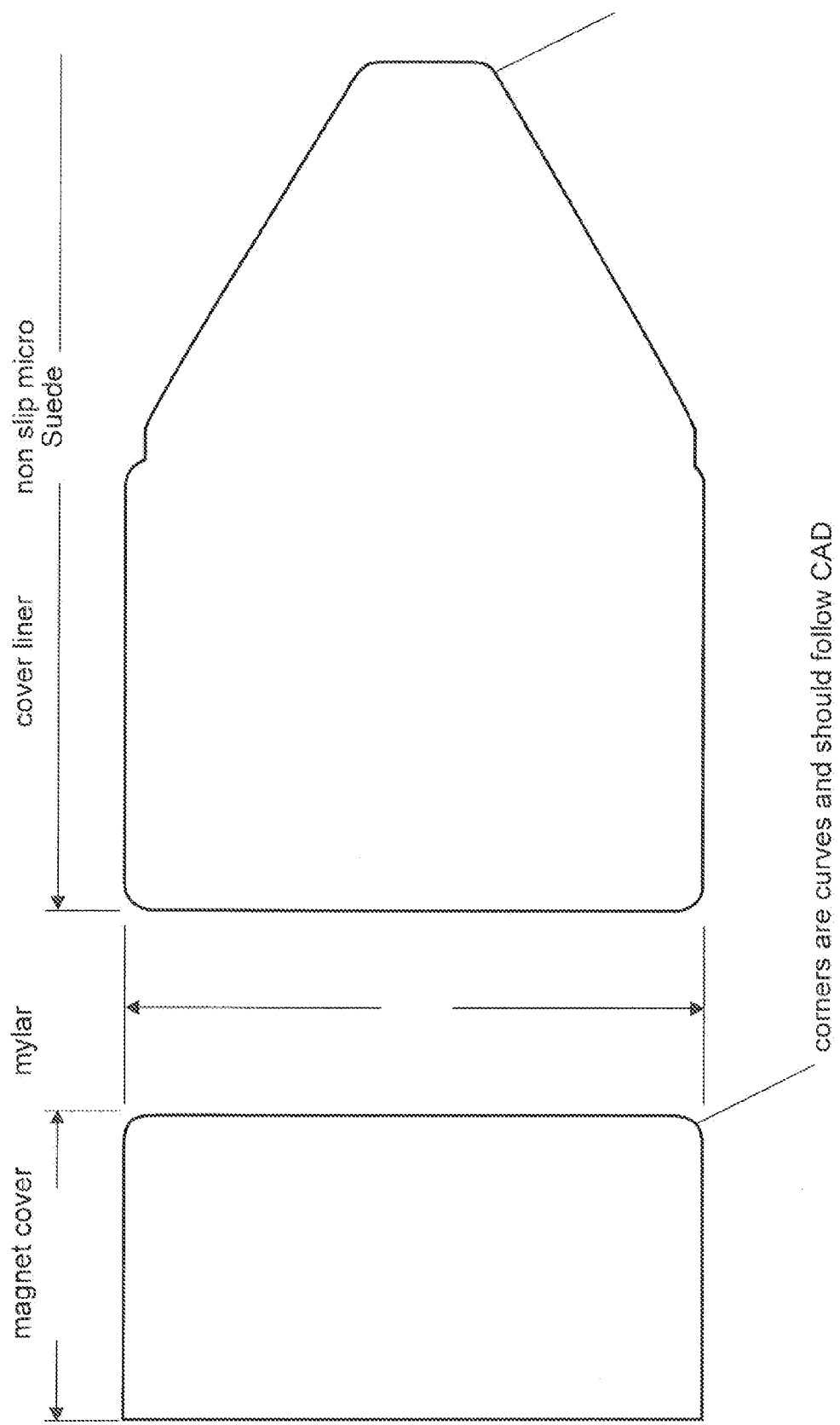

FOLIO CASE FOR A PORTABLE ELECTRONIC DEVICE WITH INLAID FABRIC

CROSS REFERENCE TO RELATED APPLICATION

The present application claims priority to U.S. Provisional Patent App. No. 61/728,560, filed on Nov. 20, 2012 and entitled FOLIO CASE FOR A PORTABLE ELECTRONIC DEVICE WITH INLAID FABRIC, the entirety of which is incorporated by reference hereby.

DESCRIPTION OF THE RELATED ART

Many folio type cases are made from multiple layers. Typically, there is a rigid or semi rigid frame or skeleton, covered by softer more decorative materials, such as woven cloth, leather, felt, vinyl, pu leather, silicone, non-woven fabric, woven fiberglass, plastic films, woven plastic or any other synthetic or natural sheet type flexible material.

Often, the softer material must be overlaid on the underlying frame, it must be conformed to account for rounded edges and other shapes, which is often difficult and results in additional labor and uneven surfaces. Any fabric that is wrapped over an edge must be finished and is usually covered by an additional layer of material to hide the seam. Further, by utilizing softer cloth material on the perimeter edge, it may be susceptible to wear and ultimately failure as it is subject continuous contact with the user and the underlying surfaces. Accordingly, a need exists for a portfolio type case that is esthetically pleasing, protective, easy to manufacture and has an outer layer that does not wrap around the perimeter edge. The present disclosure addresses these problems.

Many folio type cases used for tablets, book readers, or other personal electronic devices are designed to allow the front cover to fold toward the rear of the device to be utilized as a portion of a stand to allow the device to be elevated in a number of positions, such as for viewing and/or typing. However, because the tablet or personal device often is retained within a rigid frame only the front of the folio may be utilized to form the stand. This may cause difficulty in adjusting the stand portion and is difficult for a user. Accordingly, a need exists for a folio that has a rear portion that is releasably connected to a tablet or other personal electronic device such that a portion of the rear cover may be folded back to aid with the formation of an integrated stand. The present discloser addresses this problem.

SUMMARY

Cases for enclosing a portable electronic device are herein disclosed. The cases may be constructed from one-piece or may comprise multiple pieces. Cases of the present disclosure may be a folio type case with a front and back cover. The cases may be made from a single material or from multiple materials. The case may be used for tablet style devices, book readers, PDAs or smart phones, and is particularly suited for devices where all the controls and user access points are located on the front or sides of the device.

BRIEF DESCRIPTION OF THE DRAWINGS

FIGS. 9-11 shows a folio case with a personal electronic device installed in accordance with an embodiment of the present disclosure.

FIG. 12 is an exploded view of an embodiment of case.
FIG. 13 illustrates the back of case.
FIG. 14 illustrates case 100 from various profile and bottom positions.
FIG. 15 illustrates various profile and cross sectional views of an embodiment of case.
FIGS. 16 and 17 represent patterns of outer and inner covers.

DETAILED DESCRIPTIONS OF EMBODIMENTS

Figure 1:
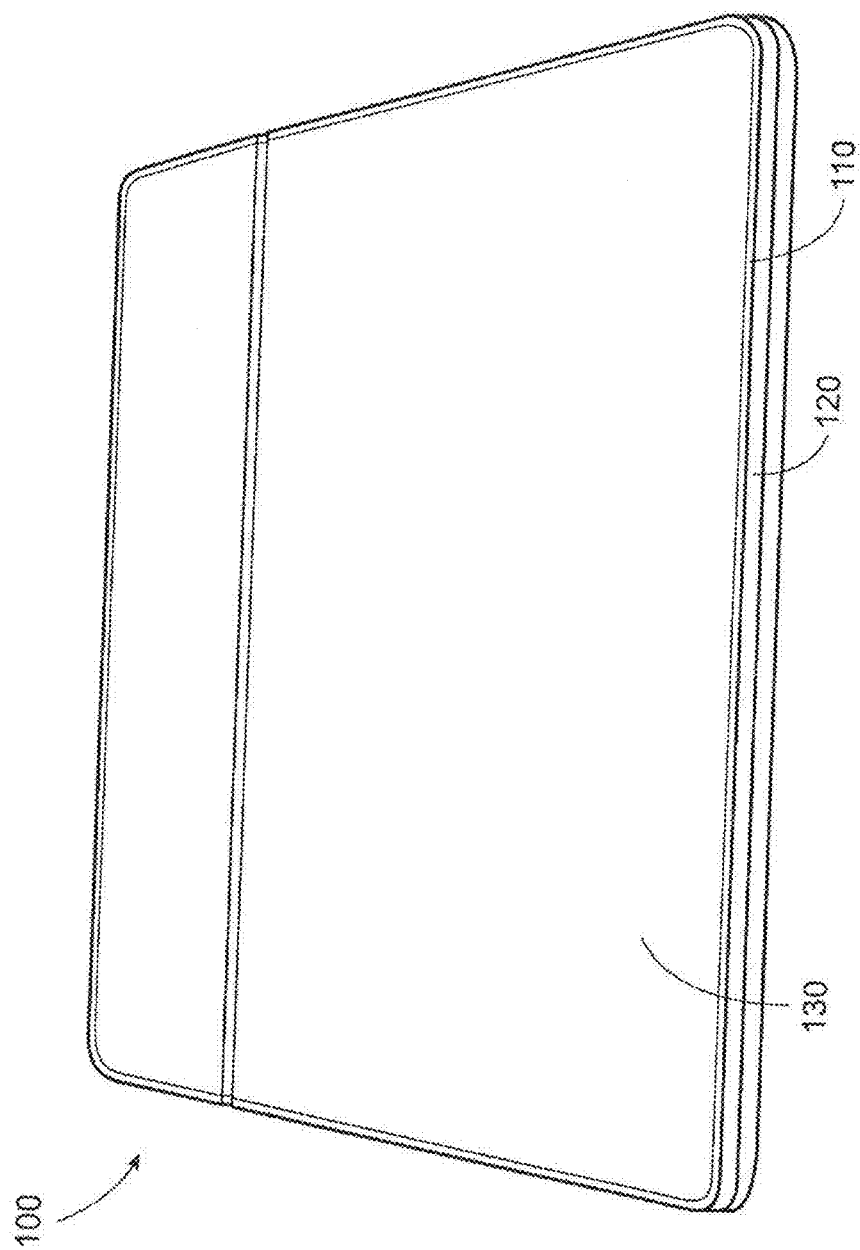
FIG. 1 depicts and embodiment of a folio type case.

The disclosed case is intended to remain attached to the user's device during operation and therefore, it is highly desirable to have a case where the user can place the cover in a open stowed position or utilize the cover as a stand, that does not interfere with the user or operation. This is especially true when using a device such as a tablet computer or book reader, where the user desires access to the front of the device for extended periods of time. Devices typically have large interactive displays, such as touch or capacitance type displays, and are often controlled by the user's finger.

Folio cases may be attached to there respective devices in many ways, such as retaining clips, hook and loops, adhesive, magnetically, and other such connection means. These methods may make it difficult to attach the folio case or may require permanent mounting of the device to the case or mounting of a connection point to the case. Other methods may result in scratching or marring of the surface of the tablet or other personal electronic device. Accordingly, a need exists for a folio type case, that is easy to connect and remove from a tablet or other personal electronic device that does not require any alterations of the device surface and which does not damage the surface of the device. The present disclosure addresses such needs.

In general, the case of the present disclosure provides for a folio type case with a raised perimeter edge that allows for inlay of a fabric cover, a magnetic release located on the spine to allow for easy and quick connection/disconnection to form a stand and hidden magnets in the rear portion of the folio to allow for easy connection to the device without the possibility of damaging the device surface.

The folio case of the present disclosures is manufactured from stiffeners or a skeleton made from molded PC or similar ridged material such as die cut fiberglass, ABS, Styrene or vinyl benzene, nylon polystyrene, polypropylene, fiberglass reinforced plastic, PMMA, polypropylene, delrin, acrylic, styrene, melamine, Kevlar, carbon and PC stiffener with TPU over molded around the edge, with a raised plastic edge around the perimeter which allows fabric, leather, vinyl, leather, or imitation leather to be inlayed. The PC portions or skeleton stiffen the panels and finish and protects the edge of the folio as well as the inlaid fabric. By having a raised edge, the fabric merely abuts the perimeter and does not need to be fitted over the edge to present a finished look. By having the raised edge and the abutted cover, the need to have a folded edge or edge painting is eliminated.

There is also a magnetic release located on the spine of the folio and connects to the spine of the tablet such as an iPad®. By disconnecting the spine magnet, a user can fold the cover back into a number of positions crating a stand using a portion of the rear cover as well as the front cover for typing, reading, or viewing. This type of case, that allows for a portion of the back surface to fold, is more intuitive to the user, and is easier to use than other folio cases.

Further, the magnets in the back of the case hold the cover to the back. The magnets are hidden behind a layer of the cover fabric.

An embodiment of the present case is a folio style case with a cover made from rigid or semi rigid materials inlaid in fabric or other type of materials such as leather. In another embodiment, the rigid material may be formed or co-molded with a more flexible edge material such as TRU, TPE, or silicone. The inlaid materials would that be applied to the rigid material surfaces. The rigid material may be PC or other type of hard plastic material such as die cut fiberglass, ABS, Styrene or vinyl benzene, Nylon Polystyrene, or Polypropylene, Fiberglass reinforced plastic, PMMA, polypropylene, delrin, acrylic, styrene, melamine, Kevlar, carbon, or carbon fiber and may be formed by injection molding. The softer edge material may be TPU and may also be injection molded. The edge material and the rigid materials may be formed at the same time or separately and then bonded together utilizing any known bonding method such as co-molding, heat, or chemical bonding. The Inlaid materials may be any type of sheet material such as such as woven cloth, leather, felt, vinyl, pu leather, silicone, nonwoven fabric, woven fiberglass, plastic films, woven plastic or any other synthetic or natural sheet type flexible material and can be affixed to the rigid surfaces utilizing adhesives. The cover may even be a flexible wood veneer or a treated paper product. Different inlay materials may be used on the inside and outside of the folio case and the shapes may be die cut. Typically, the material on the inside of the cover will be non skid so as to provide friction when the case cover is folded into a stand position. The TPU edge may have molded buttons, holes, or other access points to allow operation of any buttons on the device itself.

FIG. 1 depicts folio type case 100 with front cover 110, raised edge 120 and outer cover 130. Case 100 typically may be used for a tablet computer, but could also be used to encase a book reader, PDA, smart phone, or any other type of electronic device. Outer cover 130 may be cloth, leather, pu or imitation leather or any other flexible material. Although depicted as rectangular, case 100 may be any shape. Front cover 110 may be made from a contiguous piece of rigid or semi rigid material and raised edge 120 may encompass the entire perimeter of front cover 110. Additionally and/or alternatively, front cover 110 may be made from multiple pieces of rigid or semi rigid material and raised edge 120 may not encompass the entire perimeter of front cover 110. Outer cover 130 is inlaid over front cover 110 utilizing adhesive bonding and is abutted to raised edge 120.

Figure 2:
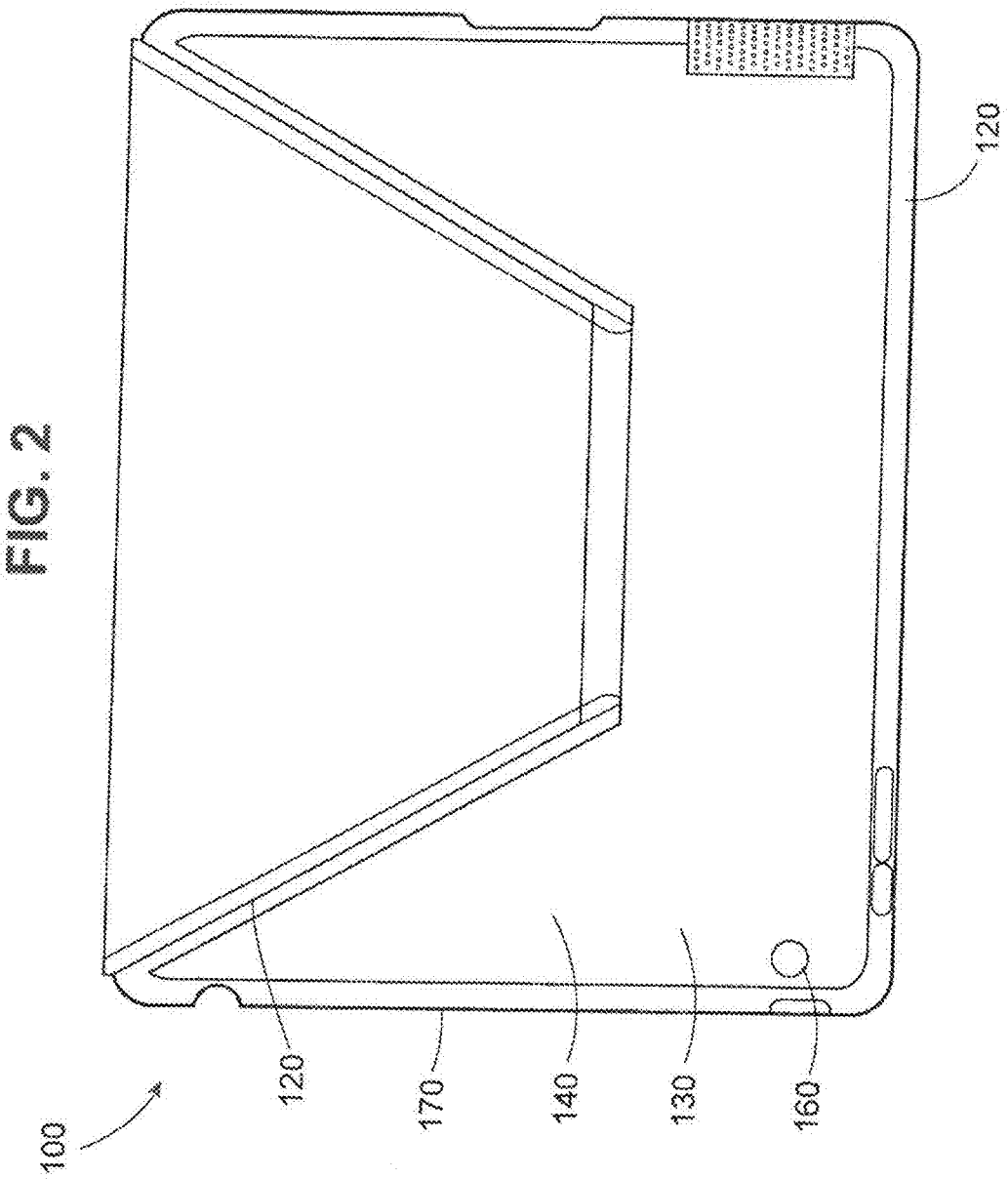
FIG. 2 shows a rear view of a folio in accordance with an embodiment of the present disclosure.

FIG. 2 shows a rear view of a folio 100 in accordance with an embodiment of the present disclosure. Rear cover portion 140 may be made from rigid or semi rigid material and may be a single piece or multiple pieces. As can be seen, rear cover 140 is also inlaid with cover 130. Cover 130 may be the same piece of fabric or leather as used to cover the front of the folio 110 or may be a separate piece of fabric or leather depending on the configuration. Rear cover 140 may have openings 160 or other access holes to allow the underlying device to be accessible. Opening 160 may be a camera lens opening or a speaker cover. Raised edges 120 may encompass the entire perimeter and are typically raised the height of the material used for cover 130. This allows the inlaid covers to abut up against raised edge 120 without wrapping around and creates a level surface between the cover and the raised edge. Soft edge 170 may be co-molded with the rigid or semi rigid front cover 140 and may be made from a malleable material such as TPU. Soft edge 170 provides additional impact cushioning and improves the esthetic look and touch of case 100.

Figure 3:
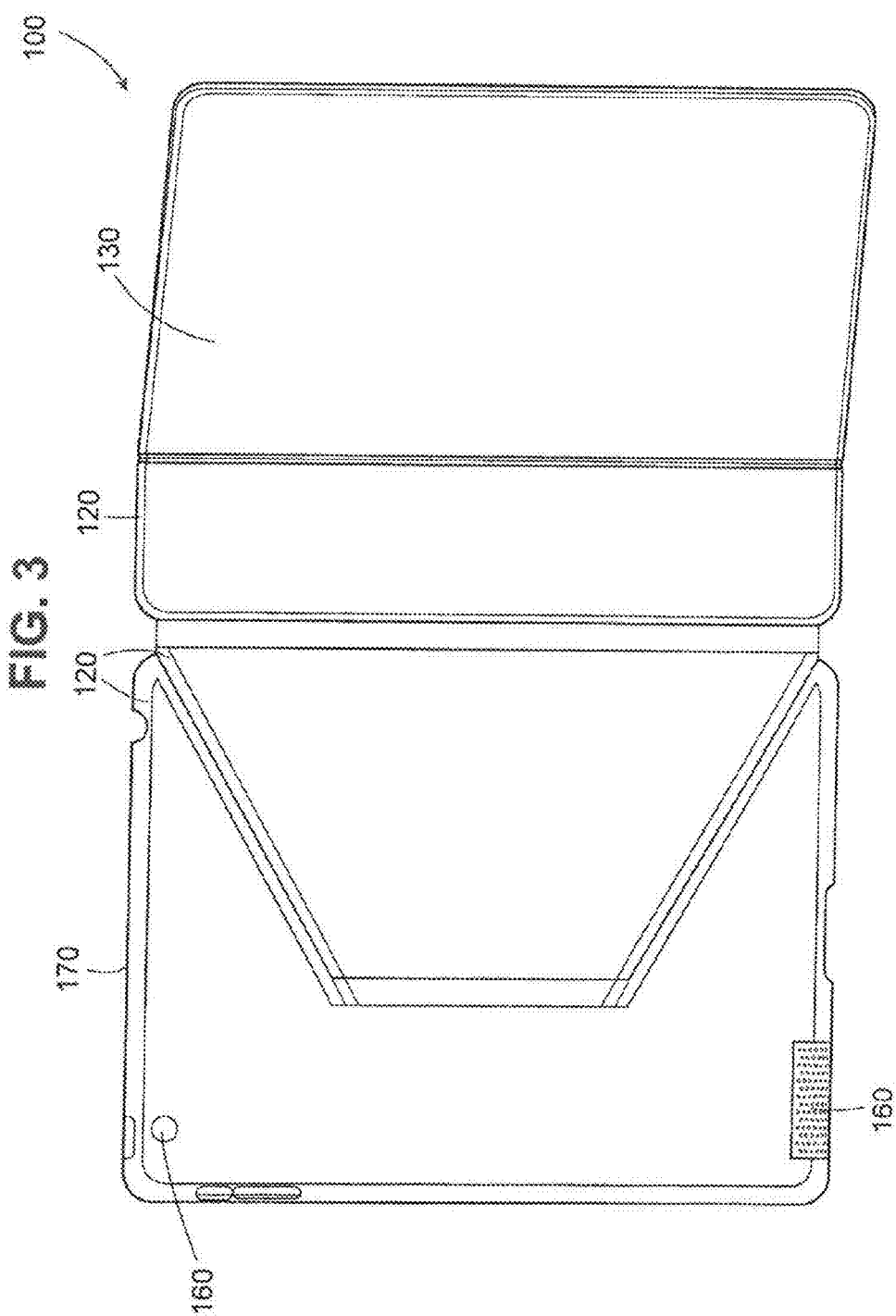
FIG. 3 depicts a rear view of a folio in accordance with an embodiment of the present disclosure.

FIG. 3 depicts a rear view of case 100 in a completely open flattened position. As can be seen in FIG. 3, cover 130 completely covers the entire outer surface of case 100 and abuts raised perimeter edge 120.

Figure 4:
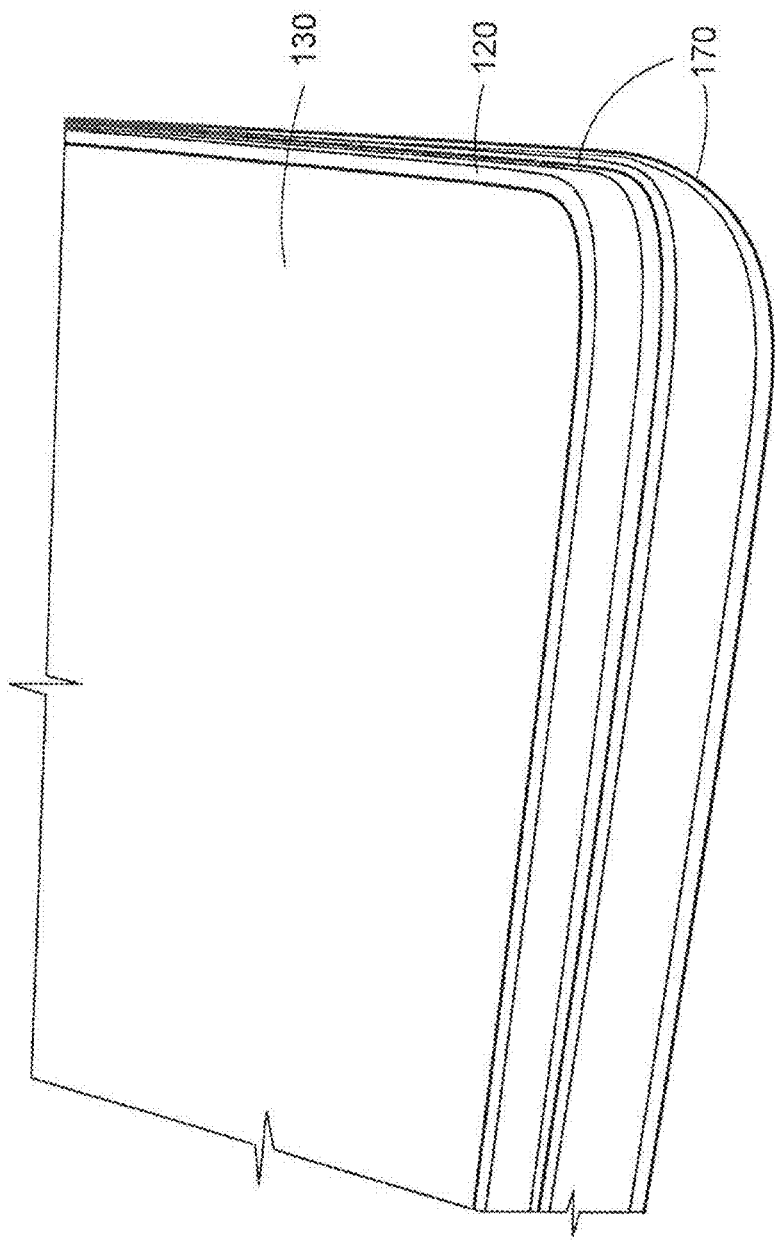
FIG. 4 depicts a close up view of the fabric inlay detail of a corner of a case in accordance with an embodiment of the present disclosure.

FIG. 4 depicts a close up view of the fabric inlay detail of a corner of case 100. As can be seen, cover 130 abuts raised edge 120 and soft edge 170 surrounds the outside or the front cover 110 and rear cover 140. Soft edge 170 may be molded out of the same or different materials as front cover 110 and/or rear cover 140. Soft edge 170 may be co-molded with or bonded to front cover 110 and rear cover 140.

Figure 5:
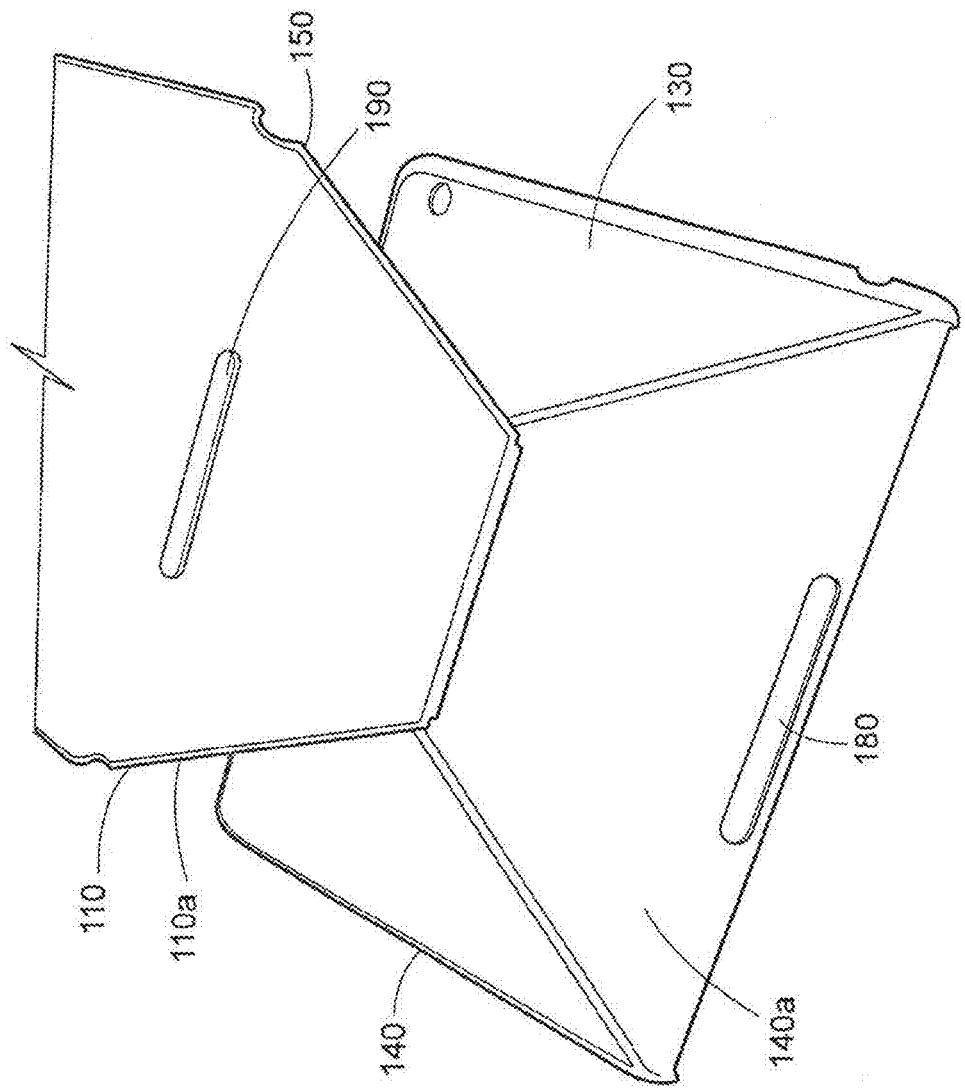
FIG. 5 depicts a rear view of case with front cover folded back over rear cover in accordance with an embodiment of the present disclosure in accordance with an embodiment of the present disclosure.

FIG. 5 depicts a rear view of case 100 with front cover 110 folded back over rear cover 140 exposing the inside of front cover 110a and an outside portion 140a of rear cover 140. Inside of front cover 110a as can be seen, is covered with cover 150 which is inlaid and abutted up to raised edge 120. Outside portion 140a of rear cover 140, is not overlaid with cover 130 or 150 so that when front cover 110 is folded back over, it fits smoothly and does not protrude from the rear cover. Also seen in FIG. 5 is spine magnet cutout 180 and spine magnet 190. Spine magnet 190 is shaped to conform to the edge of a personal electronic device such as an iPad® from Apple® and hold the folio in place.

Figure 6:
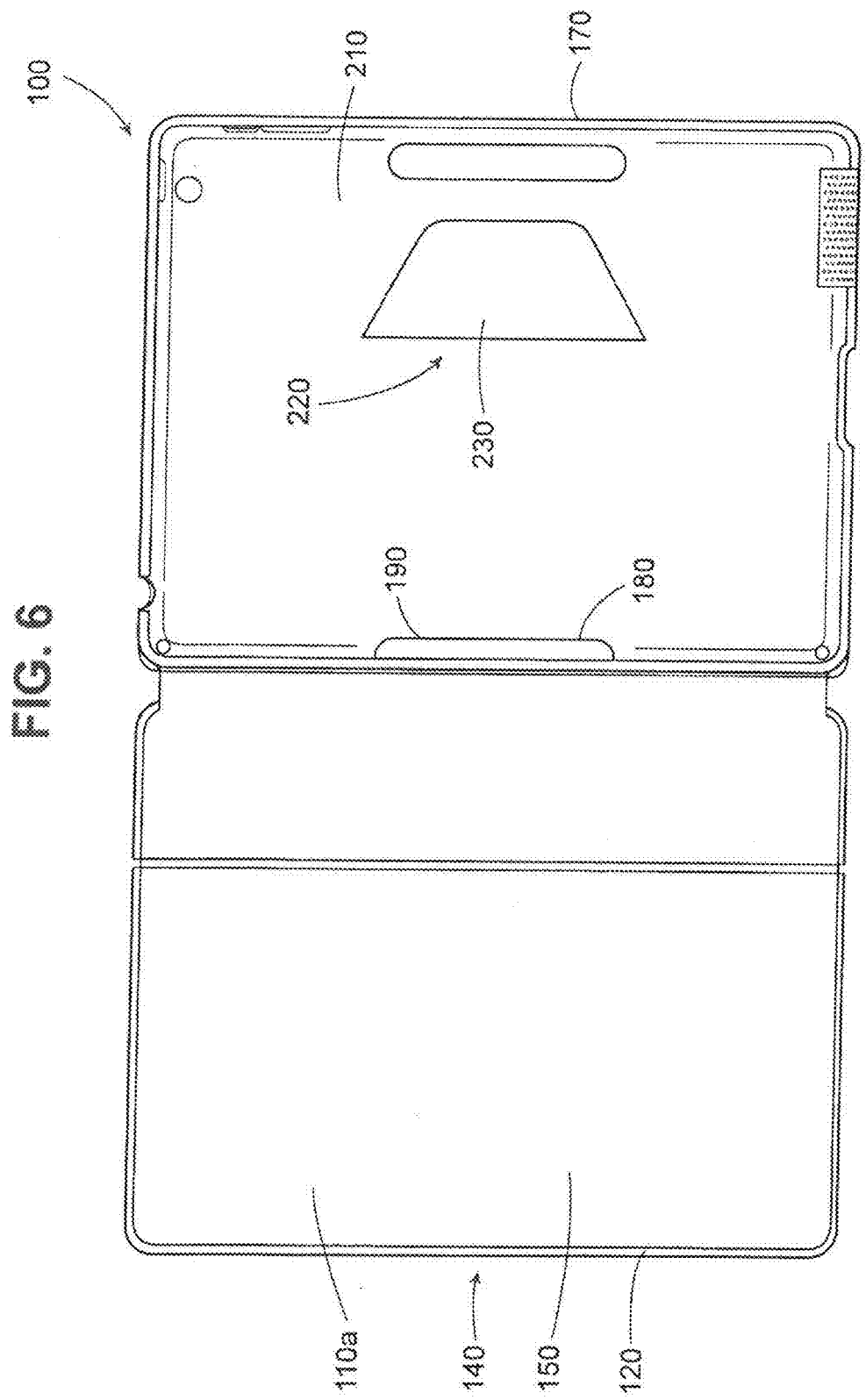
FIG. 6 depicts the inside of folio when it is in an open position in accordance with an embodiment of the present disclosure.

FIG. 6 depicts the inside of folio 100 when it is in an open position without a personal electronic device installed. The inside portion 110a of front cover 110 is inlaid with cover 150 which abuts raised edge 120. The inside portion 210 of rear cover 140 is not overlaid with a cover and is conformed to fit the personal electronic device. As seen, soft edge 170 surrounds rear cover 140 to provide extra protection. Cutout 220 is located in rear cover 140 and is positioned to allow rear magnet 230 which is covered under a portion of cover 150 to adhere to the personal electronic device once it is installed.

Figure 7:
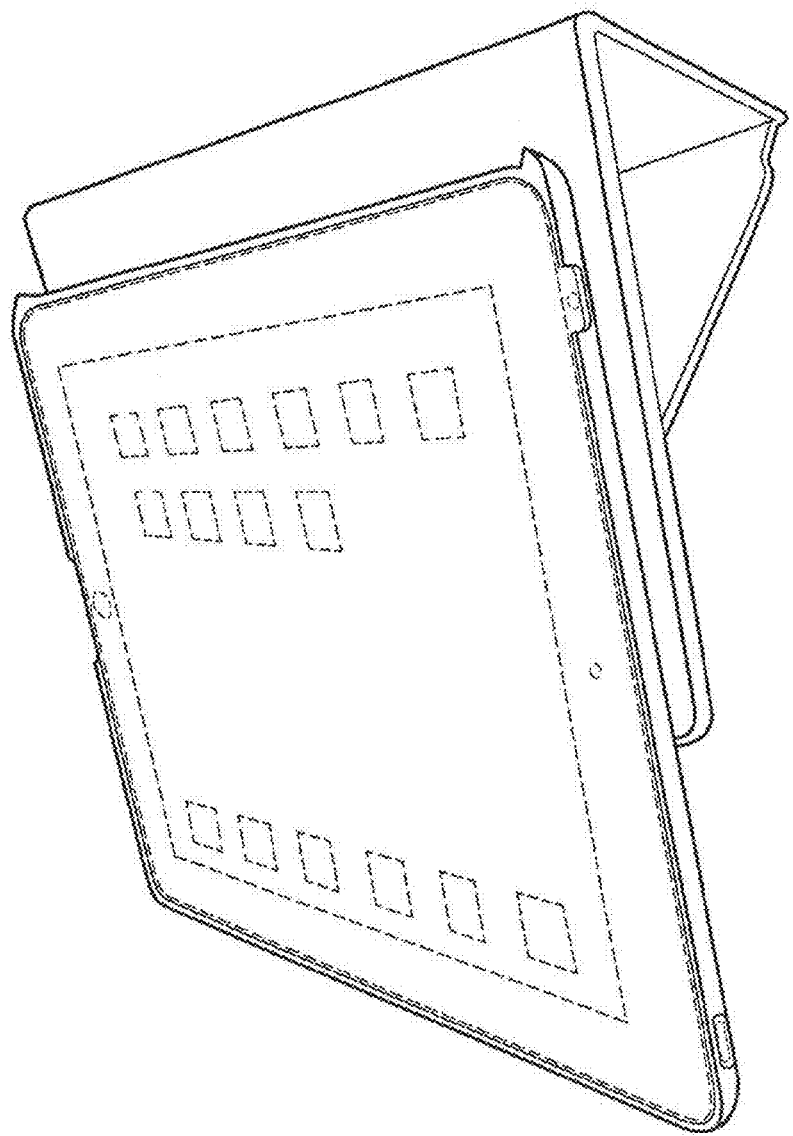
FIGS. 7 and 8 show how the folio cover may be folded into a keyboard stand in accordance with an embodiment of the present disclosure.
Figure 8:
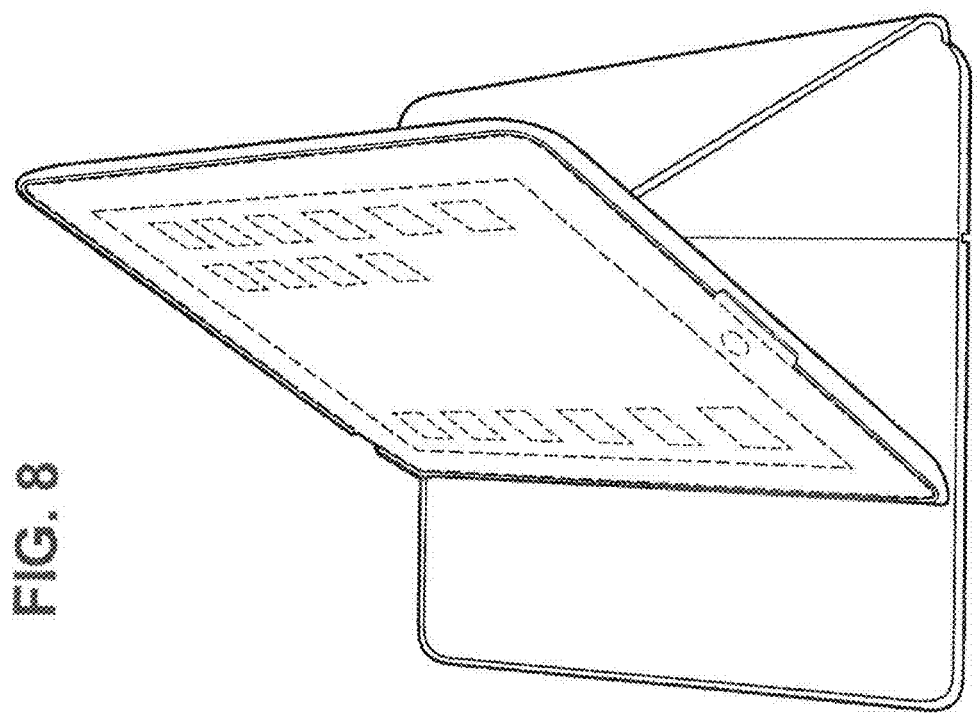

FIGS. 7 and 8 show how the folio cover may be folded into a keyboard stand for proper ergonomic positioning or into a viewing stand for ease of viewing. The releasable spine magnet 190 allows for multiple variations and intuitive folding of the cover into the various stand position.

Figure 9:
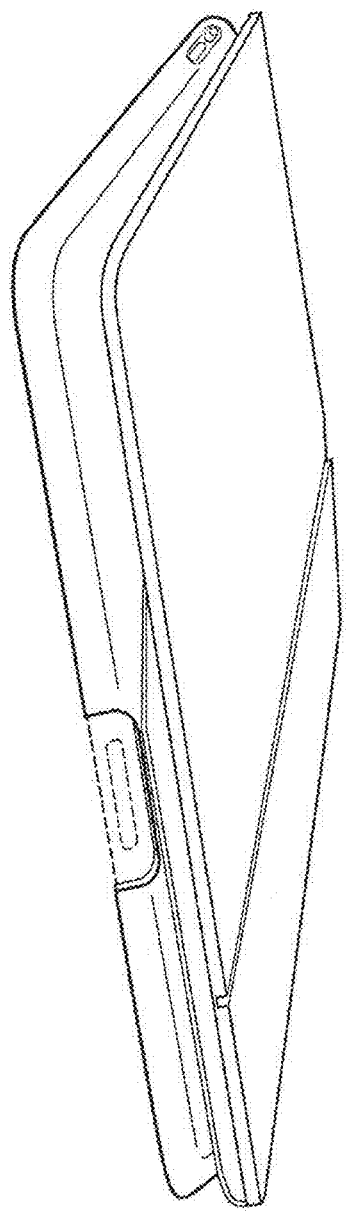

FIGS. 9-11 shows folio case 100 with a personal electronic device (PED) installed and illustrates how the various magnets may be utilized to keep the folio in an open position an attached even when the spine magnet is released, in addition to spine magnet 190 and rear magnet 230, front cover magnets 240 may be utilized to keep the front cover in a normally closed position to protect the front of the PED. Magnets 240 may be positioned and oriented in front cover 110 such that it attracts to magnets imbedded in the PED to keep the cover in place. Similarly, when the cover is folded back, as seen in FIG. 9, magnets 240 may be attracted to magnets 230 to keep the front cover 110 in a folded back position.

As seen in FIG. 10, magnet 190 should be sufficiently attractive to allow the folio spine to remain attached to the PED when the front cover 110 is in a free hanging position and not folded completely back. Similarly, rear magnet 230 should also be strong enough to ensure connectivity with the PED even when spine magnet 190 is released, as seen in FIG. 11. As will be understood by those skilled in the art, the release of spine magnet 190 allows the rear cover 140 to be folded in various positions depending on hinge positioning of the covers and further provides an addition fold point that allows for numerous fold configurations.

FIG. 12 is an exploded view of an embodiment of case 100 showing the various covers 130/150 and the inner rigid sections 250 that make up cover 110. As one of ordinary skill in the art will understand, covers 130 and 150 may be the same material or different materials with different properties. They may be made from a single sheet or may be multiple pieces fitted together. Magnets 190, 230 and 240 may be made from NeoDymium or other sufficiently magnetic materials. Additional components, such as heat sinks 260, Mylar® separation layers 270 (to isolate the magnetic surfaces), or other accessories such as camera lens rings may also be incorporated into the folio case 100.

FIG. 13 illustrates the back of case 100 in a flattened position

FIG. 14 illustrates case 100 from various profile and bottom positions. As can be seen from FIG. 14, various buttons, slides, speaker holes, may be added to case 100 to accommodate the underlying device.

FIG. 15 illustrates various profile and cross sectional views of an embodiment of case 100 in various sizes.

FIGS. 16 and 17 represent typical patterns of the outer and inner covers 130 and 150, respectively, in accordance with an embodiment of the present disclosure. As will be appreciated by those skilled in the art, these patterns may vary depending on the ultimate shape and size of case 100.

The invention claimed is:

1. A case, for enclosing a personal electronic device with a front surface, comprising:
    a front with:
        a front inside surface;
        a front outside surface; and
        at least one raised front edge which extends from the front outside surface so that the front outside surface is recessed from the raised front edge;
    a back with:
        a back inside surface to mount the personal electronic device;
        a back outside surface; and
        at least one raised rear edge which extends from the back outside surface so that the back outside surface is recessed from the raised rear edge; and
    a surface cover;
    wherein the front inside surface, the front outside surface, and the back outside surface are overlaid with the surface cover; and
    wherein the surface cover abuts the at least one raised front edge or the at least one raised rear edge; and
    wherein the back further comprises:
        a first back portion connected to the front; and
        a second back portion hingedly connected, at a central area of the second back portion, to the first back portion so that the first back portion is allowed to swing away from the personal electronic device when the personal electronic device is mounted to the back.

2. The case of claim 1;
wherein the front is inlaid with the surface cover.

3. The case of claim 1;
wherein the back is inlaid with the surface cover.

4. The case of claim 1, further comprising:
a magnet to secure the case to the personal electronic device.

5. The case of claim 4;
wherein the magnet is located in the back and is covered by the surface cover.

6. The case of claim 4, further comprising:
a spine portion between the front and the back and wherein the magnet is located on the spine.

7. The case of claim 1;
wherein the first back portion comprises a magnet.

8. The case of claim 1;
wherein the front further comprises:
    a first front portion having a first front outside surface, and being connected to the back; and
    a second front portion having a second front outside surface, and being hingedly connected to the first front portion so that the second front outside surface is allowed to swing toward the first front outside surface.

9. The case of claim 8;
wherein:
    the second front portion further comprises a second front inside surface;
    the first back portion further comprises a first back outside surface;
    the second pack portion further comprises a second back outside surface; and
    wherein the first front portion is hingedly connected to the first back portion so that the first front outside surface is allowed to swing toward the first back outside surface at the same time the second front outside surface swings towards the first front outside surface, thereby enabling the case to be folded into a keyboard stand with the second front inside surface of the second front portion contacting the second back outside surface of the second back portion.

10. The case of claim 1;
wherein the first end of the second back outside portion is hingedly connected to the first back outside portion by a flexible connection.

11. The case of claim 10;
wherein the flexible connection is formed by a flexible fabric.

12. The case of claim 1;
wherein the front further comprises:
    a first front portion having a first front outside surface, and being connected to the back; and
    a second front portion having a second front outside surface, and being hingedly connected to the first front portion so that the second front outside surface is allowed to swing toward the first front outside surface.

13. The case of claim 8;
wherein:
    the second front portion further comprises a second front inside surface;
    the first back portion further comprises a first back outside surface;

the second pack portion further comprises a second back outside surface; and wherein the first front portion is hingedly connected to the first back portion so that the first front outside surface is allowed to swing toward the first back outside surface at the same time the second front outside surface swings towards the first front outside surface, thereby enabling the case to be folded into a keyboard stand with the second front inside surface of the second front portion contacting the second back outside surface of the second back portion.

14. The case of claim 1;

wherein the first end of the second back outside portion is hingedly connected to the first back outside portion by a flexible connection.

15. The case of claim 10;

wherein the flexible connection is formed by a flexible fabric.

16. The case of claim 1;

wherein the front further comprises:
- a first front portion having a first front outside surface, and being connected to the back; and
- a second front portion having a second front outside surface, and being hingedly connected to the first front portion so that the second front outside surface is allowed to swing toward the first front outside surface.

17. The case of claim 8;

wherein:
- the second front portion further comprises a second front inside surface;
- the first back portion further comprises a first back outside surface;
- the second pack portion further comprises a second back outside surface; and wherein the first front portion is hingedly connected to the first back portion so that the first front outside surface is allowed to swing toward the first back outside surface at the same time the second front outside surface swings towards the first front outside surface, thereby enabling the case to be folded into a keyboard stand with the second front inside surface of the second front portion contacting the second back outside surface of the second back portion.

18. The case of claim 1;

wherein the first end of the second back outside portion is hingedly connected to the first back outside portion by a flexible connection.

19. The case of claim 10;

wherein the flexible connection is formed by a flexible fabric.

* * * * *